United States Patent
Harrison et al.

(10) Patent No.: US 6,317,128 B1
(45) Date of Patent: Nov. 13, 2001

(54) GRAPHICAL USER INTERFACE WITH ANTI-INTERFERENCE OUTLINES FOR ENHANCED VARIABLY-TRANSPARENT APPLICATIONS

(75) Inventors: Beverly L. Harrison; William A. S. Buxton; Shumin Zhai, all of Toronto (CA)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 08/978,524

(22) Filed: Nov. 25, 1997

Related U.S. Application Data (63) Continuation of application No. 08/634,185, filed on Apr. 18, 1996, now abandoned.

(51) Int. Cl.[7] .................................................. G06T 3/00
(52) U.S. Cl. ............................ 345/435; 345/431; 345/113
(58) Field of Search .................................... 345/431, 432, 345/429, 426, 435, 433, 113, 114, 147

(56) References Cited

U.S. PATENT DOCUMENTS

| | | | |
|---|---|---|---|
| 4,591,897 | 5/1986 | Edelson | 358/22 |
| 4,827,253 | 5/1989 | Maltz | 340/734 |
| 4,982,343 | 1/1991 | Hourvitz et al. | 364/521 |

(List continued on next page.)

FOREIGN PATENT DOCUMENTS

| | | |
|---|---|---|
| 635779 A1 | 1/1995 | (EP) . |
| 635780 A1 | 1/1995 | (EP) . |
| 635781 A1 | 1/1995 | (EP) . |

OTHER PUBLICATIONS

Harrison et al., "An Experimental Evaluation of Transparent User Interface Tools and Information Content," *Proc. of the ACM Symposium on UIST*, (1995), pp. 81–90.

(List continued on next page.)

*Primary Examiner*—Stephen S. Hong
(74) *Attorney, Agent, or Firm*—Sterne, Kessler, Goldstein & Fox P.L.L.C.

(57) ABSTRACT

A system and method for providing a graphical user interface (GUI) with anti-interference outlines for enhanced user attention and fluency of work. The GUI utilizes transparency to merge images (or layers) of objects onto a graphical display. For example, variably-transparent (transparent/semi-transparent) or "see through" objects, such as menus, tool palettes, windows, dialogue boxes, or screens are superimposed over similar objects or different background content, such as text, wire-frame or line art images, and solid images. Anti-interference outlines are utilized to heighten the visibility and hence legibility of objects by mitigating visual interference, which is typically the result of overlaying similar colors or luminance values such that one layer "blends" into another. The GUI calculates a luminance level of a particular object and then surrounds the object with a luminance-contrasting border or anti-interference outline, thus enhancing visual distinctiveness of the particular object while maintaining all the advantages of transparency.

23 Claims, 9 Drawing Sheets

U.S. PATENT DOCUMENTS

| | | | |
|---|---|---|---|
| 5,017,143 | 5/1991 | Backus et al. | 434/236 |
| 5,283,560 | 2/1994 | Bartlett | 345/113 |
| 5,355,446 | 10/1994 | Maayan | 395/134 |
| 5,428,724 | 6/1995 | Silverbrook | 395/135 |
| 5,442,788 | 8/1995 | Bier | 395/650 |
| 5,473,737 | 12/1995 | Harper | 395/131 |
| 5,475,812 | 12/1995 | Corona et al. | 395/158 |
| 5,479,603 | 12/1995 | Stone et al. | 395/161 |
| 5,487,145 | 1/1996 | Marsh et al. | 395/162 |
| 5,530,795 | 6/1996 | Wan | 395/153 |
| 5,561,811 | 10/1996 | Bier | 395/825 |
| 5,581,670 | 12/1996 | Bier et al. | 395/326 |
| 5,590,265 | 12/1996 | Nakazawa | 395/340 |
| 5,617,114 | 4/1997 | Bier et al. | 345/113 |
| 5,638,501 * | 6/1997 | Gough et al. | 395/135 |
| 5,651,107 | 7/1997 | Frank et al. | 395/344 |
| 5,678,015 | 10/1997 | Goh | 395/355 |
| 5,737,554 | 4/1998 | Epelman-Wang et al. | 395/339 |

OTHER PUBLICATIONS

Bier et al., "A Taxonomy of See–Through Tools," *Proceedings of CHI '94*, Boston, Ma, pp. 358–364.

Bier et al., "Toolglass and Magic Lenses: The See–Through Interface," *Proceedings of SIGGRAPH '93*, Anaheim, Ca, pp. 73–80.

Harrison, B. L., et al., "Transparent Layered User Interfaces: An Evaluation of a Display Design to Enhance Focused and Divided Attention," *Proceedings of CHI '95*, Denver, Colorado, pp. 317–324.

Ishii et al., Clearboard: A Seamless Medium for Shared Drawing and Conversation with Eye Contact, *Proceedings of CH'92*, Monterey, Ca, pp. 525–532.

MacLeod, C., "Half a Century of Research on the Stroop Effect: An Integrative Review," *Psychological Bulletin*, vol. 109, No. 2, pp. 163–203, 1991.

Stone et al., "The Movable Filter as a User Interface Tool," *Proceedings of Chi '94*, Boston, Ma, pp. 306–312.

Zhai et al., "The "Silk Cursor": Investigating Transparency for 3D Target Acquisition," *Proceedings of CHI '92*, Monterey, Ca, pp. 525–532.

* cited by examiner

GRAPHICAL USER INTERFACE WITH ANTI-INTERFERENCE OUTLINES FOR ENHANCED VARIABLY-TRANSPARENT APPLICATIONS

This application is a continuation; of application Ser. No. 08/634,185, filed Apr. 18, 1996, now abandoned.

RELATED APPLICATION

This application is related to commonly owned, application Ser. No. 08/634,211, filed on the same date herewith, titled "Graphical User Interface With Optimal Transparency Thresholds For Maximizing User Performance And System Efficiency" now U.S. Pat. No. 6,118,427.

BACKGROUND OF THE INVENTION

1. Field of the Invention

The present invention relates generally to a system and method for displaying objects. More particularly, the present invention relates to graphical user interfaces providing variably-transparent (transparent/semi-transparent) layered objects.

2. Related Art

Graphical User Interfaces (GUIs) provide a gateway between users and virtually all types of application programs for visualizing and manipulating application-specific objects or information. A problem with GUIs has been efficiently displaying a number of objects (e.g., windows, menus, and tool palettes) within a limited display (e.g., computer screen or terminal) area. Indeed, the rather limited amount of display real estate relative to the increasing amount of information to be displayed presents a real and prevailing challenge to GUI design.

There have been generally two broad strategies to address the problem. The first entails a space multiplexing strategy. That is, the screen is partitioned (or tiled) into a number of non-overlapping windows. The second is a time multiplexing (or temporal sequencing) strategy. With this type of strategy, windows are arranged on top of one another, with only the top-most window being visible at any given time and a mechanism (e.g., a mouse interface) is provided to rapidly change which window is visible.

Conventionally, most GUIs have utilized hybrid approaches rather than either one of these strategies exclusively. For example, conventional GUIs typically provide both static or permanently visible windows and dynamic menus which are only visible by user selection or request (e.g., drop-down, pop-up, pull-down, and pull-out menus). Drop-down menus are typically anchored in a menu bar along an edge of the screen. Pop-up menus and windows, however, generally appear at the cursor location to maintain the user's center of visual attention and continuity.

A disadvantage of any of these approaches is that some displayed objects (images) are completely or partially obscured, thereby blocking the context in which the user is working (task space or work surface). That is, all objects that are below or behind a fully opaque window or menu are not visible to the user. Thus, when an opaque rectangular pull-down menu (foreground object) containing a list of user options is displayed, all object images (background objects) falling behind the menu are obstructed. This invariably has an adverse effect on the utility of conventional GUIs.

The extent of the disruption to the user is directly related to the persistence of the foreground object (ie., how long the object remains displayed). In the case of menu item selection, obstruction is short-term. However, in the case of overlapping windows, for example, the length of time this obstruction exists is long-term. Accordingly, the visual disruption is persistent and highly problematic.

Recent advances in technology make it possible and often desirable to use variably-transparent (transparent/semi-transparent) windows, menus, or other objects such that the user can "see through" to underlying layers. Fully transparent interfaces include the Heads Up Displays (HUDs) used in aviation and the Clearboard system. See, Ishii et al., *Clearboard: A seamless medium for shared drawing and conversation with eye contact*, Proceedings of CHI'92, Monterey, Calif., 525–532. In the HUD systems, aircraft instrumentation (a graphical computer interface) is superimposed on the external real world scene, using specially engineered windshields. In the Clearboard system, a large drawing surface is overlaid on a video image of the user's collaborative partner, where the superimposed images are presented as a "drafting" table.

Similarly, in other rare instances, GUIs have also used semi-transparent (partially transparent or translucent) techniques, such as stippling. These techniques generally allow foreground object images (e.g., menus, tool palettes, work areas, or windows) to be superimposed over background object images, while permitting the background object images to remain visible to the user. Applications using such techniques include video overlays (e.g., sport scores overlaid on the game in play) and "3-D silk cursors." See, Zhai et al., *The "silk cursor:" Investigating transparency for 3D target acquisition*, Proceeding of CHI'94, Boston, Mass., 459–464.

A similar application involving semi-transparent menus (a class of interactive widgets) which do not completely block other object images on a computer display is disclosed in U.S. Pat. No. 5,283,560 to Bartlett. As such, images falling below the menus remain visible, thus making the menus less intrusive during menu operation.

Accordingly, variably-transparent GUIs allow multiple object image "layers" to be simultaneously observed. Correspondingly, these interfaces are instrumental in providing integration between user tool space (foreground) and task space (background), between multiple tools, or between different object images. For example, such interfaces allow the user to interact with foreground objects, carry out activities, or change parameters that are ultimately reflected in a background layer (e.g., color changes, font changes, view changes). Correspondingly, these GUIs provide the user with a more efficient mechanism to perform operations without being overly disruptive.

While solving one problem, these conventional variably-transparent GUIs create others, namely visual interference (i.e., reduced visibility and legibility). For example, when a foreground object (e.g, a widget) is made semi-transparent, object images below the widget tend to interfere with the legibility of the widget itself.

The degree of visual interference is generally a function of transparency. The higher the transparency of the foreground object, the higher the severity of the visual interference, wherein completely transparent foreground objects have the maximum interference from the background. As the degree of foreground transparency reduces toward opaque, the degree of visual interference is also reduced. This, however, mitigates the very advantage of variable-transparency since it significantly diminishes visibility of background object images.

Visual interference is particularly severe with foreground and background objects of similar colors (e.g., the color(s)

of menu items closely matching the color(s) of background object images below the menu). Since any color may appear in the background (created/controlled by the application user), this can happen no matter which color is chosen for the text (icons etc.) on the widgets (created by the application designer). Accordingly, visual interference generally precludes use of variable-transparency with a wide range of practical applications.

SUMMARY OF THE INVENTION

The present invention is a system and method for providing a graphical user interface with anti-interference (AI) outlines for substantial improvement in legibility and overall usability of variably-transparent applications, particularly interactive software applications with "see through" menus, tool palettes, or windows.

For any particular object displayed in the graphical user interface, the present invention determines the visual characteristics of the object (e.g., color or luminance) and then surrounds that object with a contrasting outline (e.g., a contrasting color or luminance), thereby ensuring that either the object or its border will contrast with an underlying or background image.

The foregoing and other features and advantages of the present invention will be apparent from the following, more particular description of the preferred embodiments, as illustrated in the accompanying drawings.

BRIEF DESCRIPTION OF THE FIGURES

Referring now to the drawings which form a part of this original disclosure.

The preferred embodiments of the present invention are described with reference to the figures where like reference numbers indicate like elements. Also in the figures, the left most digit of each reference number corresponds to the figure in which the reference number is first used.

DETAILED DESCRIPTION OF THE PREFERRED EMBODIMENTS

The preferred embodiments of the present invention are discussed in detail below. While specific model numbers and/or configurations are discussed, it should be understood that this is done for illustration purposes only. A person skilled in the relevant art will recognize that other components and configurations may be used without parting from the spirit and scope of the present invention.

General Hardware/Software Environment

Figure 1:
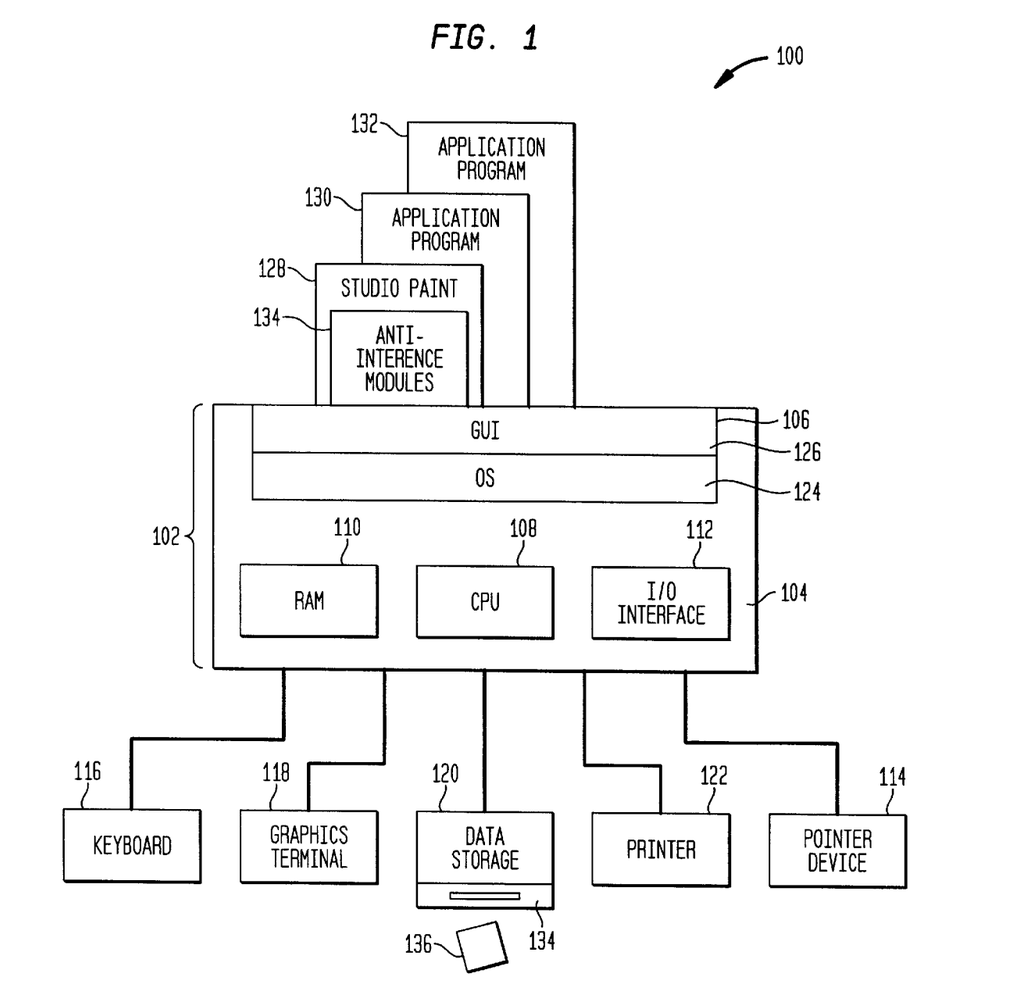
FIG. 1 illustrates a general hardware/software environment in accordance with a preferred embodiment of the present invention.

FIG. 1 illustrates a general hardware/software environment 100 in which a preferred embodiment of the present invention can operate. Environment 100 includes a computer platform 102 having a hardware unit 104 and a software unit 106. Hardware unit 104 includes a central processing unit (CPU) 108, random access memory (RAM) 110, and an input/output (I/O) interface 112.

While any personal computer, workstation, or mainframe computer can be utilized with the present invention, in this preferred embodiment, hardware unit 104 is a Silicon Graphics Workstation, Model Indy, manufactured by Silicon Graphics Incorporated (SGI), 2011 North Shoreline Boulevard, Mountain View, Calif., 94039-7311. As such, CPU 108 is a processor from the MIPS family of processors including processors from the R4000 or R8x00 family. Alternatively, the present invention can use any commercially available SGI workstation (e.g., Model Indigo2) for hardware unit 104.

Hardware unit 104 is also operably connected to a number of peripheral devices including a pointer device 114 (e.g., mouse or puck), a keyboard 116, a graphics terminal 118, secondary storage devices 120, and a printer 122. Secondary storage devices 120 can include, for example, a hard disk drive (not expressly illustrated in FIG. 1) and/or a removable storage drive 134, representing a floppy disk drive, a magnetic tape drive, a compact disk (CD) drive, and the like. Correspondingly, a removable storage unit 136 represents a floppy disk, a magnetic tape, or CD for use with removable storage drive 134.

Software unit 106 includes an operating system (OS) 124 and a graphical user interface (GUI) 126. In this preferred embodiment, OS 124 is an IRIX operating system, version 5.3 or greater, and GUI 126 is an X11 interface, version 6, both of which are available from SGI. It is noted that the term GUI, as used herein, is not intended to narrowly denote a discrete layer of software or hardware. Rather the scope of the term is intended to encompass any combination of software techniques (implemented within an OS, a discrete GUTI software layer, an application program, or any combination thereof).

Environment 100 further includes a number of application programs 128, 130, and 132 layered over software unit 106. In this preferred embodiment, application program 128 is StudioPaint®3.0, from Alias/Wavefront, 110 Richmond Street East, Toronto, Ontario, Canada M5C 1P1. Application program 128, in conjunction with OS 124 and GUI 126, handles user inputs from pointer device 114 and a keyboard 116. Application program 128 also outputs a series of graphic commands to facilitate the images/representations (i.e., detailed geometric descriptions and attributes) of objects/data displayed on graphics terminal 118.

In this preferred embodiment, the present invention is implemented with anti-interference modules 134, which are incorporated into application program 128. As would be apparent to a person skilled in the relevant art, however, the present invention can alternatively be incorporated into any OS (e.g., OS 124) or GUI (e.g., GUI 126), thereby providing the features of the present invention across a plurality of application programs (e.g., application programs 128, 130, and 132).

Anti-Interference Modules

The present invention provides a transparency-based GUI with anti-interference outlines for enhanced user attention and fluency of work. The present invention, operating in conjunction with application program 128 (i.e., Alias/ Wavefront StudioPaint®), assists the user in focusing his/her attention while the user alternately or concurrently works in the task/work space (background) and the tool space (foreground).

With respect to variably-transparent GUIs there are generally three critical user attention components associated with visual interference: focused attention, divided attention, and "switching cost." As is briefly discussed below, these attention components tend to have conflicting GUI solutions. A detailed discussion of these components is provided in the related, commonly owned, co-pending application Ser. No. 08/634,211, filed on the same date herewith, titled "Graphical User Interface With Optimal Transparency Thresholds For Maximizing User Performance And System Efficiency," pending, which is herein incorporated by reference.

Visual interference impacts the user's ability to properly focus on tasks or objects. That is, a GUI typically presents multiple sources of objects (e.g,. tool palettes, work areas, or multiple windows) on the display, and the user correspondingly makes choices about what to attend to and when. At times, the user needs to focus exclusively (focused attention) on a single object without interference from other objects. At other times, the user typically needs to timeshare (divided attention) between two (or more) objects of interest.

Thus, the user must be visually aware of multiple objects which overlap and obscure each other during various "tasks" (e.g., text editing, drawing, and animation). By their very nature, at any given instance, some tasks are relatively active while others are relatively passive. Correspondingly, the user requires only a peripheral awareness of passive tasks while requiring a greater focus on any particular active ask. The extent of this awareness determines the extent to which the user must focus or divide his/her attention.

Furthermore, task characteristics largely determine the user's attention requirements and minimum acceptable performance levels. These task characteristics are generally predetermined by the nature of the task and are therefore not under the exclusive GUI control.

Thus, the first component associated with visual interference is focused attention or the ability of the user to separate the visual characteristics of each object image and focus on any single object with minimal distraction from other objects. That is, for focused attention the user generally needs to ignore background objects and focus on foreground objects. Focused attention examples include: working on a document when a dialog box or warning message interrupts and selecting a pull-down menu (or pie menu) which temporarily blocks part of an active window.

As such, for focused attention, a GUI must distinguish the attributes of foreground objects as much as possible from attributes of background objects. Thus, it is generally desirable to decrease the visibility (decrease opacity) of background objects and increase the visibility (increase opacity) of foreground objects. In other words, focused attention generally requires decreasing the transparency of foreground objects.

The second user attention component is divided attention. Divided attention is the ability of the user to divide attention between two or more objects or being able to distinguish foreground and background layers. Divided attention examples include: using tear-off tool palettes (which behave as tiny overlapping windows); collaborating with a partner shown in a video window, in which the user wants to glance at both the partner and the work in progress (e.g., a drawing or a document); viewing a live video conversation with one person while monitoring several video connections to others for peripheral awareness of their availability; and using an interactive dialog box to change the drawing or modeling characteristics of an underlying image, model, or animation.

Divided attention therefore requires the GUI to be able to visually separate those features that belong to the foreground and background in order to accurately perceive the corresponding objects. Thus, contrary to the requirements of focused attention, a GUI must support simultaneous visibility of both object layers, by generally increasing the opacity of background objects and increasing transparency of the foreground objects.

The third user attention component is the "switching cost" (in terms of time, mechanism, learning, and awareness) associated with the user shifting attention from one object (or a group of objects) to another where each object (or group of objects) requires a different type of attention (i.e., focused or divided).

Some GUI solutions involve improving one of these attention components at a cost to other components. For example, a GUI can provide the user with a mechanism for varying the transparency level to enhance the user's focused attention. However, such a solution generally degrades the divided attention component. Additionally, GUIs can use attribute controls for fonts styles, sizes, and colors to reduce the visual interference effects, particularly when the user must engage in divided attention. However, attribute controls have limited applicability since these attributes are generally predetermined by the user's task, particularly the content of the background or task/work space.

The present invention is a system and method of providing a GUI which significantly overcomes these conflicting attention requirements (ie., focused and divided attention) in an effective and efficient manner. As such, the present invention improves task performance by allowing the user to work fluently (i.e., low switching costs) without significant interruption from the "tools" needed to attain the task goals.

Figure 2:
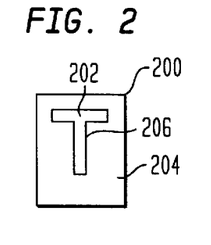
FIG. 2 illustrates a text-based example (with a white foreground and background) of an anti-interference outline (in contrasting black) in accordance with a preferred embodiment of the present invention.
Figure 3:
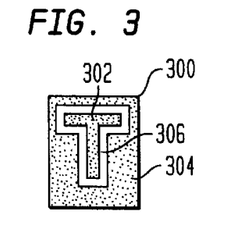
FIG. 3 illustrates a text-based example (with a black foreground and background) of an anti-interference outline (in contrasting white) in accordance with a preferred embodiment of the present invention.

In particular, the present invention provides anti-interference (AI) outlines to variably-transparent objects (e.g., menus). FIGS. 2 and 3 illustrate text-based examples of AI outlines using letters. FIG. 2 illustrates a foreground menu item 200 consisting of the image of a white letter "T" 202 and a white background 204. The visual distinctiveness of letter 202 is enhanced with a black contrasting AI outline 206 having a single pixel in width. Similarly, FIG. 3 illustrates a foreground menu item 300 consisting of the image of a black letter "T" 302 and a black background 304. In this instance a contrasting white AI outline 306 of two pixels in width is applied.

Figure 4:
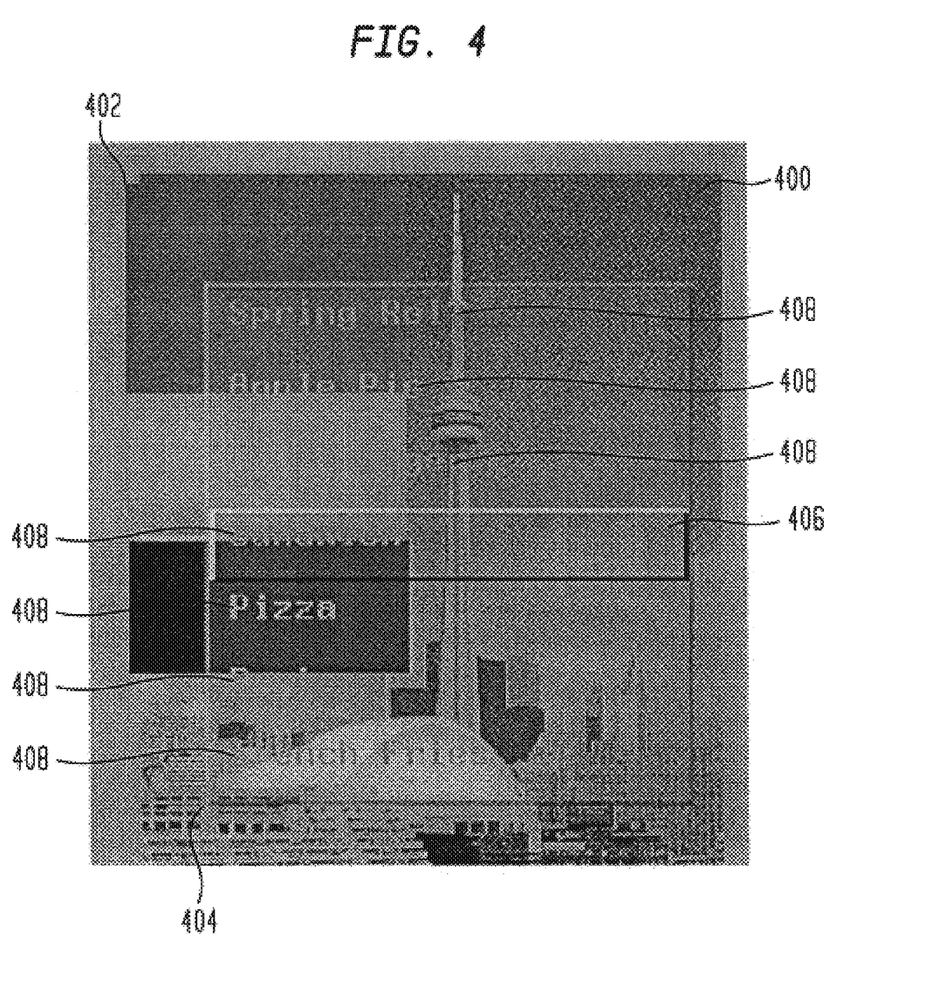
FIG. 4 illustrates several menus with 20% foreground and 80% background combined transparency without anti-interference outlines.
Figure 5A:
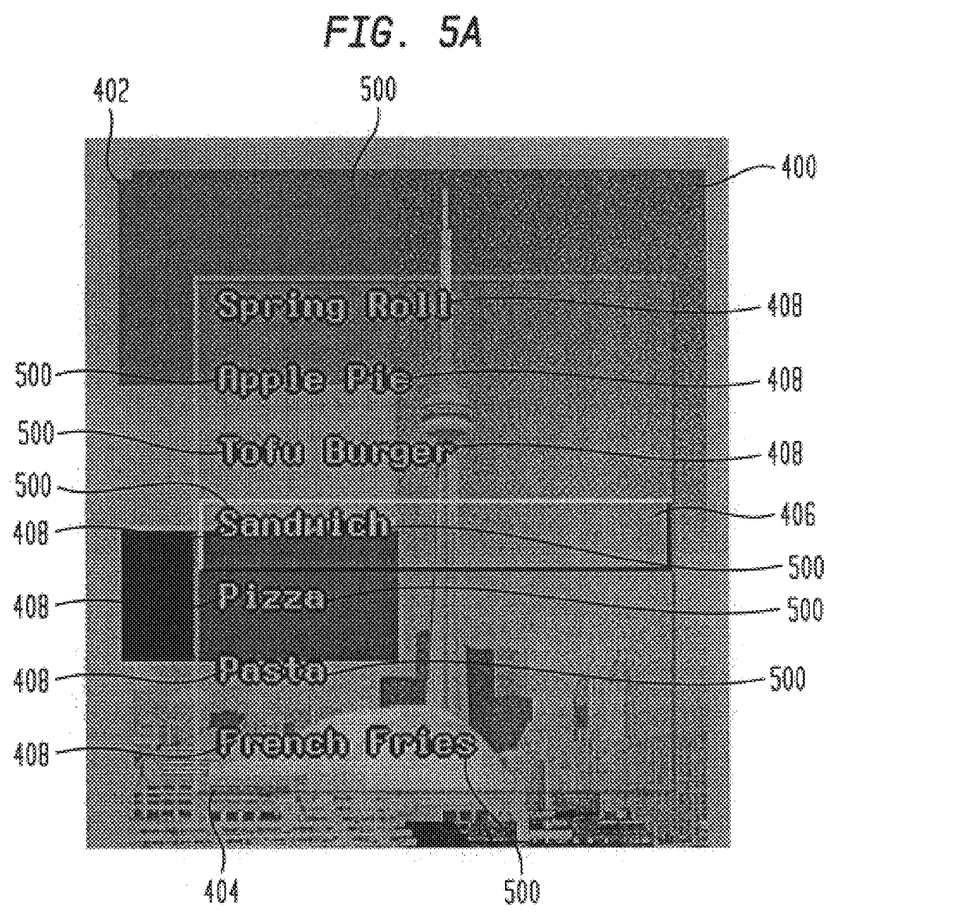
FIG. 5A illustrates several menus with 20% foreground and 80% background combined transparency with font style anti-interference outlines in accordance with a preferred embodiment of the present invention.

A greater appreciation for AI outlines is attained with reference to FIGS. 4 and 5A. It is noted that while the images of FIGS. 5A and 5B (discussed below) are produced with adequate resolution to sufficiently demonstrate the advantages of the present invention, the actual effect of the present invention with displayed images (e.g., on graphics terminal 118) is significantly accentuated. FIG. 4 illustrates several images with 20% foreground and 80% background combined transparency without AI outlines. Windows 400 (displaying a view of the Toronto skyline) and 402 are the two window images in the background with a menu 404 (listing lunch items 408) and a selection bar 406 in the foreground. As shown, the image of lunch items 408 visually "blends" with the image of background windows 400 and 402. In the extreme instances such lunch items 408 completely "vanish" where the color (or luminance) of windows 400 and 402 and menu 404 are so similar that no contrast is discernible.

FIG. 5A illustrates windows 400 and 402 and menu 404 with selection bar 406 at the same 20% foreground and 80% background combined transparency; however, the visual distinctiveness of lunch items 408 is significantly enhanced with font style AI outlines 500 in accordance with the preferred embodiment of the present invention. With AI outlines 500 those "vanished" lunch items 408 (e.g., "Tofu Burger," "Sandwich, Pasta," and "French Fries") are now clearly distinguishable (compare FIGS. 4 and 5A). As such, AI outlines 500 significantly enhance the legibility (e.g., desirable for focused attention) of lunch items 408 while concurrently realizing the advantages associated with transparency. That is, the user can view the background images of windows 400 and 402 simultaneously with viewing menu 404 (e.g., desirable for divided attention).

Figure 5B:
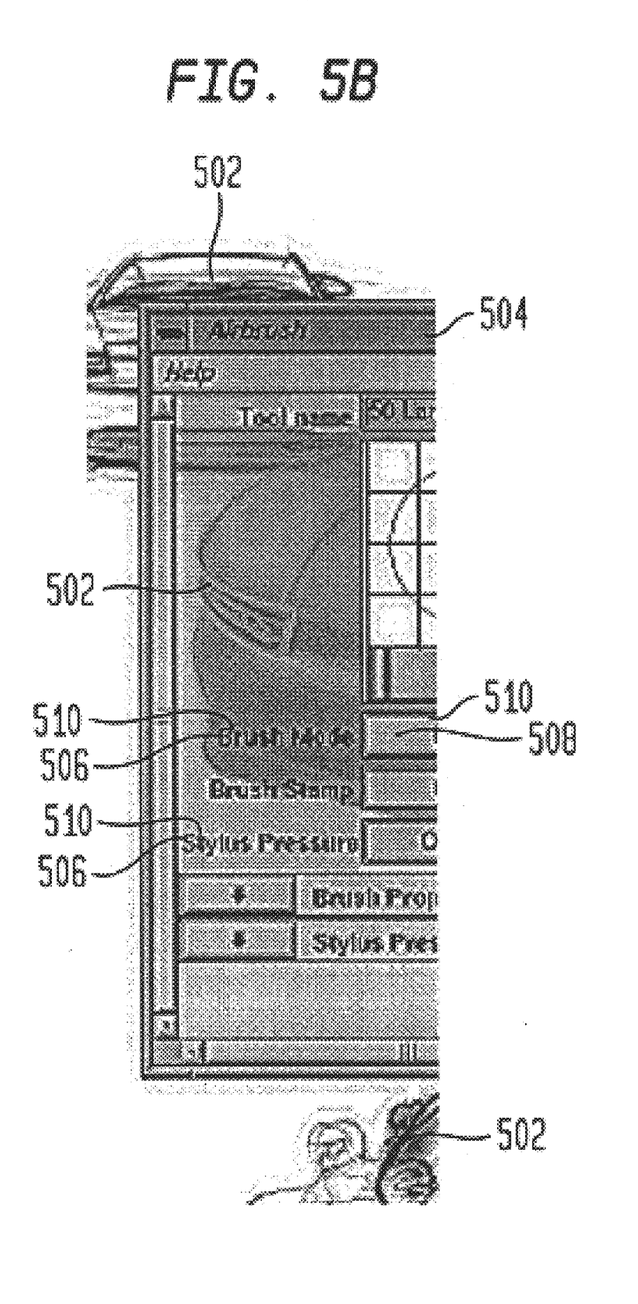
FIG. 5B illustrates a window-over-window scenario with 50% foreground and 50% background combined transparency with anti-interference outlines in accordance with a preferred embodiment of the present invention.

As the following illustrates, AI outlining techniques work equally well for text, icons, or other graphical objects. While FIGS. 4 and 5A illustrate simplified examples for the application of AI outlines, FIG. 5B illustrates AI outlines applied to a more traditional window-over-window scenario. In FIG. 5B, a background window 502 has images of car designs, produced using application program 128 (i.e., StudioPaint®). A foreground window 504 shows a segment of a semi-transparent StudioPaint® tool window used to change airbrush properties. As shown, AI outlines enhance the visibility and/or legibility of both text items 506 and button objects 508.

While there are many well known techniques of generating semi-transparent objects, this preferred embodiment utilizes stippling (such that foreground objects (e.g., menus) appear semi-transparent). This technique is also commonly referred to as the "screen-door transparency" approach in computer graphics. For example, see Foley, J. D. et al., *Computer Graphics: Principles and Practice*, 2nd ed., Addison-Wesley Publishing Co., Reading, Mass. (1990).

Another technique which can be used with the present invention is alpha blending (or interpolated transparency) which is readily available on many commercially available computer workstations. With this technique semi-transparent objects are generated to blend a background color (source) intensity, $I_s$, with the color intensity of the image below a foreground object (e.g., widget), $I_d$, in accordance with the following formula:

$$I = \alpha I_s + (1-\alpha) I_d$$

See, Foley, J. D. et al., *Computer Graphics: Principles and Practice*, 2nd ed., Addison-Wesley Publishing Co., Reading, Mass. (1990) at p. 754.

Another feature of the present invention is that AI outline properties are associated with each object. Whenever application 128 renders or draws any form of graphical objects on graphics terminal 118, the object properties must be specified. Object properties generally include information regarding the x,y coordinate (or object position), object color(s), and object size. In addition to these properties, the present invention maintains AI outline policy properties for each object. These properties include information regarding whether an AI outline is required, AI outline width, AI outline color, and AI outline luminance value.

In this preferred embodiment, the object properties and AI outline policy properties are built into each object itself, in a well known manner. However, as would be apparent to one skilled in the relevant art, AI outline policy properties can alternatively be stored in a separate file (as opposed to integrating the properties with the object properties) or they can be computed dynamically at render or draw time.

The decision to compute and display AI outlines can be made on a per-object basis or on a global (i.e., all objects) basis. In the preferred embodiment, the computation and display of AI outlines is determined on a global basis (i.e., all objects are drawn with AI outlines) whenever a condition of greater than approximately 50% transparency applies (i.e., approximately 50% or less of the foreground image is combined with approximately 50% or more of the background image). In the instances where the transparency level is less than approximately 50% transparency (i.e., more than approximately 50% of the foreground image is combined with less than approximately 50% of the background image), AI outlines are not applied. More details of the derivation of this aforementioned 50% transparency threshold level are found in the related, commonly owned, co-pending application, titled "Graphical User Interface With Optimal Transparency Thresholds For Maximizing User Performance And System Efficiency" which has been incorporated by reference. AI outlines, however, can be applied to objects of any transparency level including opaque objects.

In addition to the application of a general decision criterion based on threshold transparency levels, a person skilled in the relevant art will recognize that other or additional decision criteria can be used. For example, one such preferred criteria is a measure of the information density (complexity) of the two or more image contents which are to be overlapped in a semi-transparent manner. Various mathematical techniques can be used to quantify this information complexity, such as Fourier transformations or frequency measures for the image composition. Applying such criteria can produce two possible outcomes for deciding whether or not the computation and application of AI outlines has maximal benefit. As described above, a decision to globally apply AI outlines to all objects can result. Alternatively, specific regions may be designated and AI outlines are correspondingly computed and applied to any object falling within these regions (in effect this represents an object-by-object decision or a region-by-region decision, where a region can be comprised of one or more proximal objects).

In general, as illustrated in the following pseudo-code, rendering or drawing an object in accordance with the present invention generally entails the following high level steps:

```
DrawObject
    read object properties
    read AI outline policy properties for object
    display object using these properties
endDrawObject
```

Figure 6:
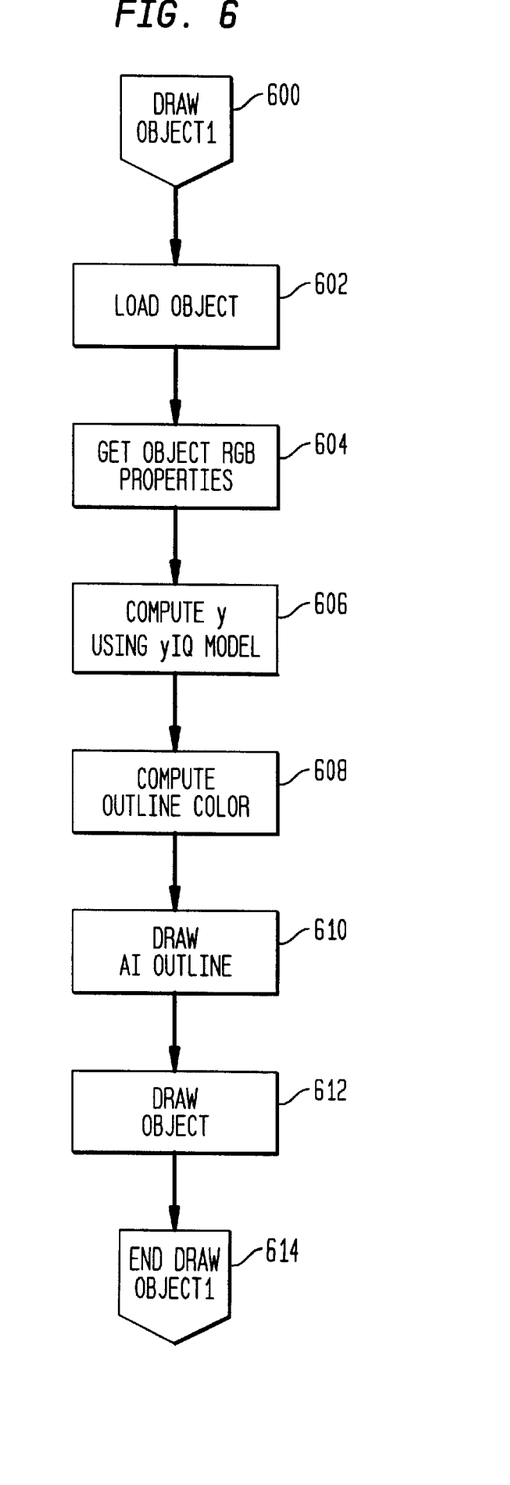
FIG. 6 illustrates a flow diagram of a draw object module in accordance with a preferred embodiment of the present invention.
Figure 7:
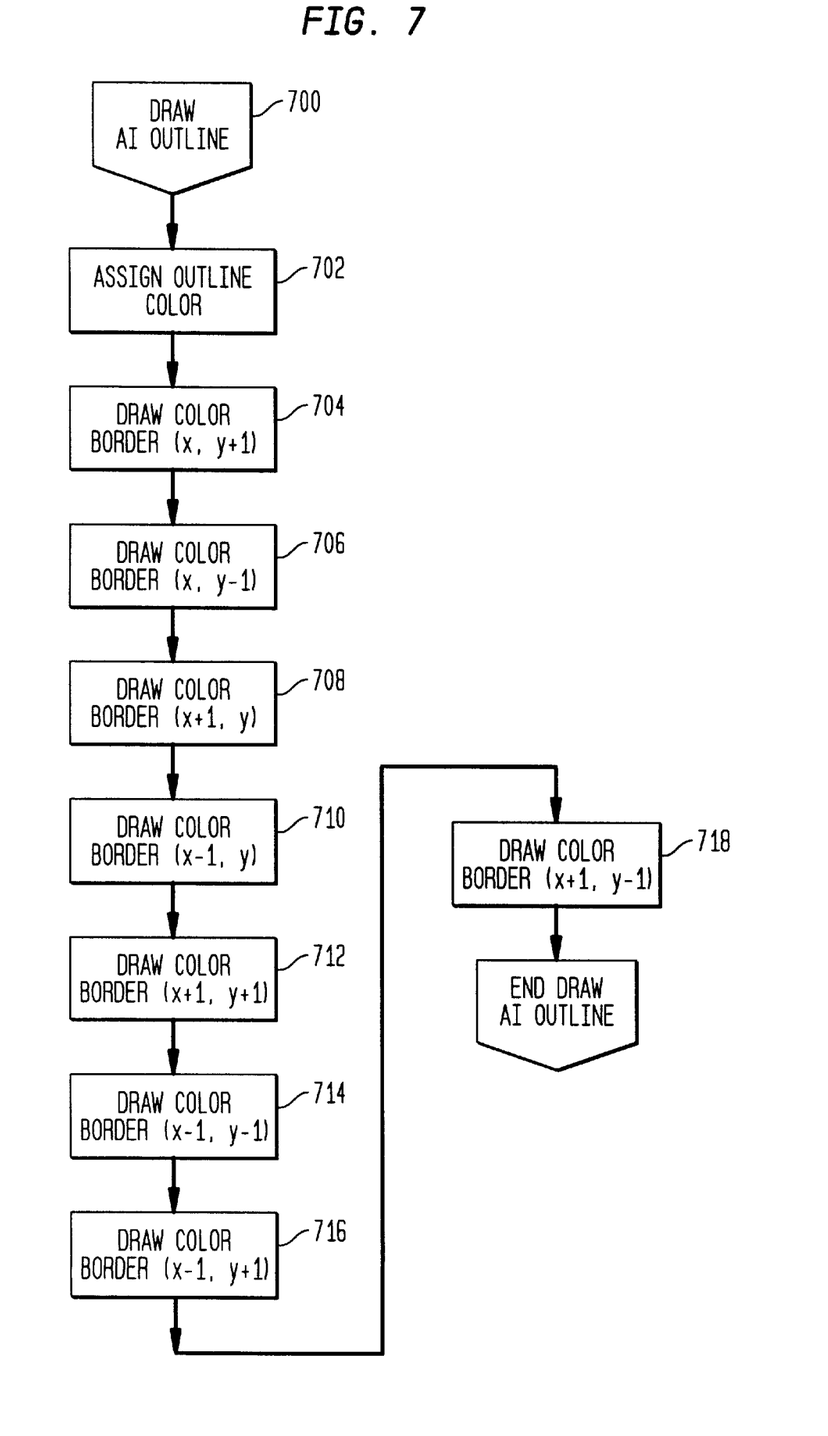
FIG. 7 illustrates a flow diagram of a draw anti-interference outline module in accordance with a preferred embodiment of the present invention.

With reference to FIGS. 6 and 7, the following pseudo-code illustrates the detailed description of DrawObject1 600 and DrawAIOutline 700 modules of this preferred embodiment:

```
600    DrawObject1
602        load object
604        get object RGB properties
606        compute object luminance Y according to YIQ model
               (based on the object RGB value)
608        compute outline color according to Y value
610        DrawAIOutline(x,y,outline color)
612        DrawObject2(x,y,object color)
614    endDrawObject1
700    DrawAIOutline(x,y, outline color)
702        assign outline color(outline color)
704        drawColorBorder(x,y+1)
706        drawColorBorder(x,y−1)
708        drawColorBorder(x+1,y)
710        drawColorBorder(x−1,y)
712        drawColorBorder(x+1,y+1)
714        drawColorBorder(x−1,y−1)
716        drawColorBorder(x−1,y+1)
718        drawColorBorder(x+1,y−1)
720    endDrawAIOutline
```

That is, for each object to be rendered (drawn) with an AI outline, this preferred embodiment first loads/reads 602 a data structure having the object properties (discussed above) to get 604 a corresponding object color properties (a color vector (Red, Green, Blue) or (R, G, B)). In those instances where an object contains multiple color components, the preferred embodiment determines the object luminance level using the largest contributing color vector, based on area or size of the color region.

The preferred embodiment then calculates 606 a luminance value Y (defined to be the same as the CIE Y primary) according to the well known YIQ color model used in television broadcasting. For more detailed discussion of YIQ color models see, Foley, J.D. et al., *Computer Graphics: Principles and Practice*, 2nd ed., Addison-Wesley Publishing Co., Reading, Mass. (1990) at 589–590. The YIQ model is particularly useful with AI outlines since the model is considerably accurate with respect to luminance. In general, the YIQ model uses a 3D Cartesian coordinate system. The RGB-to-YIQ mapping is defined as follows:

$$\begin{vmatrix} Y \\ I \\ Q \end{vmatrix} = \begin{vmatrix} 0.299 & 0.587 & 0.114 \\ 0.596 & -0.275 & -0.321 \\ 0.212 & -0.528 & 0.311 \end{vmatrix} \begin{vmatrix} R \\ G \\ B \end{vmatrix}$$

Based on the value of Y, the preferred embodiment then computes 608 an AI outline color with the maximal luminance contrast with the color of the object. That is, the AI outline of the object is rendered in a color which has the maximal contrast with the color of the object itself. While any range of contrast can be utilized with the present invention, in order to maximize the luminance contrast between the object and its AI outline, there are generally two optimal color vectors: [0, 0, 0] (black) when $Y > Y_{max}/2$; and $[R_{max}, G_{max}, B_{max}]$ (white) when $Y < Y_{max}/2$, where $Y_{max}$ is the maximum luminance value and $R_{max}, G_{max}, B_{max}$ are the maximum color values.

As such, in this preferred embodiment only two AI outline colors (approximately black and white) are utilized. When the luminance level of an object is more than or equal to half of the possible maximum luminance in the system, the AI outline color is set with the lowest level of luminance (i.e., a black color). When the luminance level of an object is less than half of the possible maximum luminance in the system, the AI outline color is set with the highest level of luminance (i.e., a white color).

As illustrated above, this preferred embodiment of the present invention computes AI outlines using contrasting luminance and the YIQ model. A person skilled in the relevant art will readily recognize that a number of other color models or inversion strategies could also be used to compute a visually contrasting AI outline. For instance, the intensity level (which is a logarithmic scale between 0 and 1) of an object can be used to generate an "inverse intensity" level for its the AI outline (ie., an inverse log of the object intensity value). Such an approach is most appropriate for objects which are greyscale (and hence is a less general approach than the chromatic YIQ modeled approach).

Alternatively, the present invention can use different well known color models. CRTs typically use RGB models which tend to vary based on specific CRT phosphor properties. However, RGB models can be readily converted to the Commission Internationale de l' Eclairage (CIE) standard which then can generate contrasting AI outline values. As such, the contrasting AI outline can be based on the CIE components: wavelength, saturation, or luminous energy. Either the luminous energy or a complement wavelength (which can be mapped to a complementary color) would likely be most appropriate for determining the optimal contrasting AI outline. As indicated above, the CIE Y component (luminous energy) is defined to be equivalent to the Y component of the YIQ model.

In addition, the AI outlines could easily be derived using complementary colors or opposing brightness/lightness using software models. While the above models are typically represented in hardware, there are a number of software oriented models, such as HSV (also known as HSB), HLS, and HVC. The HSV (or HSB) mod el components are hue, saturation, and value (or brightness). The HLS model components are hue, lightness, and saturation. The more recent Tektronix TekHVC model components are hue, value, and chroma. Using one of these other color models in either software or hardware to compute an inverted component AI Outline is clearly within the spirit and scope of the present invention.

In addition, a number of possible algorithms can also be applied after the AI outline properties are determined (e.g, step 608). In particular, anti-aliasing techniques can be applied to sharpen or clarify the resulting image. This does not alter the purpose or utility of AI outlines; rather, such techniques further enhance the techniques of the present invention and the resulting image. It will be apparent to a person skilled in the relevant art that well known anti-aliasing techniques can be readily used with the present invention. Such techniques include area sampling, the a upta-Sproull method, Hatfield's method, or the Naiman-Fournier method (for text), which are described in most standard computer graphics text books such as Foley, J. D. et al., *Computer Graphics: Principles and Practice*, 2nd ed., Addison-Wesley Publishing Co., Reading, Mass. (1990).

Figure 8:
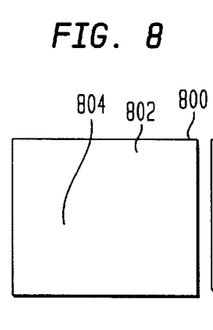
FIG. 8 illustrates a window before the drawing of an object with an anti-interference outline in accordance with a preferred embodiment of the present invention.
Figure 9:
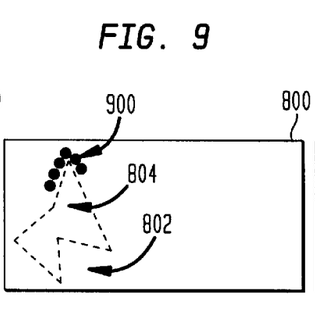
FIG. 9 illustrates a window with the drawing of an anti-interference outline in progress in accordance with a preferred embodiment of the present invention.
Figure 10:
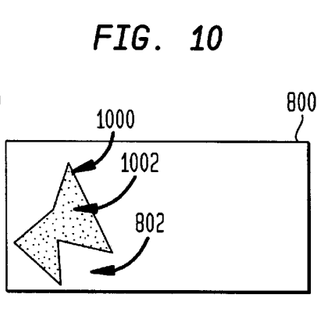
FIG. 10 illustrates a window with an object and an anti-interference outline in accordance with a preferred embodiment of the present invention.

With reference again to FIG. 6, once the luminance value Y is calculated (step 606), this preferred embodiment then draws the AI outline (step 610). With reference to FIGS. 8, 9, and 10, the following briefly describes and illustrates the steps of DrawAIOutline 700 (shown in FIG. 7). FIG. 8 illustrates a window 800 with a white background 802 and a target object location 804 prior to the drawing of a corresponding object. As illustrated in FIG. 9, the preferred embodiment first draws a one-pixel wide outline 900 by offsetting (using x,y offsets) one position (steps 704–718) in all directions from target object location 804. FIG. 10 illustrates a completed AI outline 1000 surrounding an image of the corresponding object 1002 which was drawn in a conventional manner (step 612). Alternatively, rather than using x,y offsets, other methods of drawing the contrasting AI outline can be utilized with the present invention. For example, a scaling factor can be used to create an area slightly greater than the object (e.g., object size ×105%).

Furthermore, as would be apparent to one skilled in the relevant art, there are a number of additional embodiments of the present invention, particularly with respect to the object's appearance or properties. For example, while the preferred embodiment illustrates a method of dynamically creating and drawing an AI outline prior to drawing (or re-drawing) the object, this procedure can be used, with only minor modifications, to create a new instantiation of the object which is saved and loaded from a file. Alternatively, a bitmap of the object itself can be modified to include an AI outline.

To accurately assess the advantages and benefits of AI outlines, the inventors of the present invention conducted a number of systematic empirical evaluations of user performance. The evaluations compared user response times and error rates for both non-AI outline and AI outline conditions.

Figure 11:
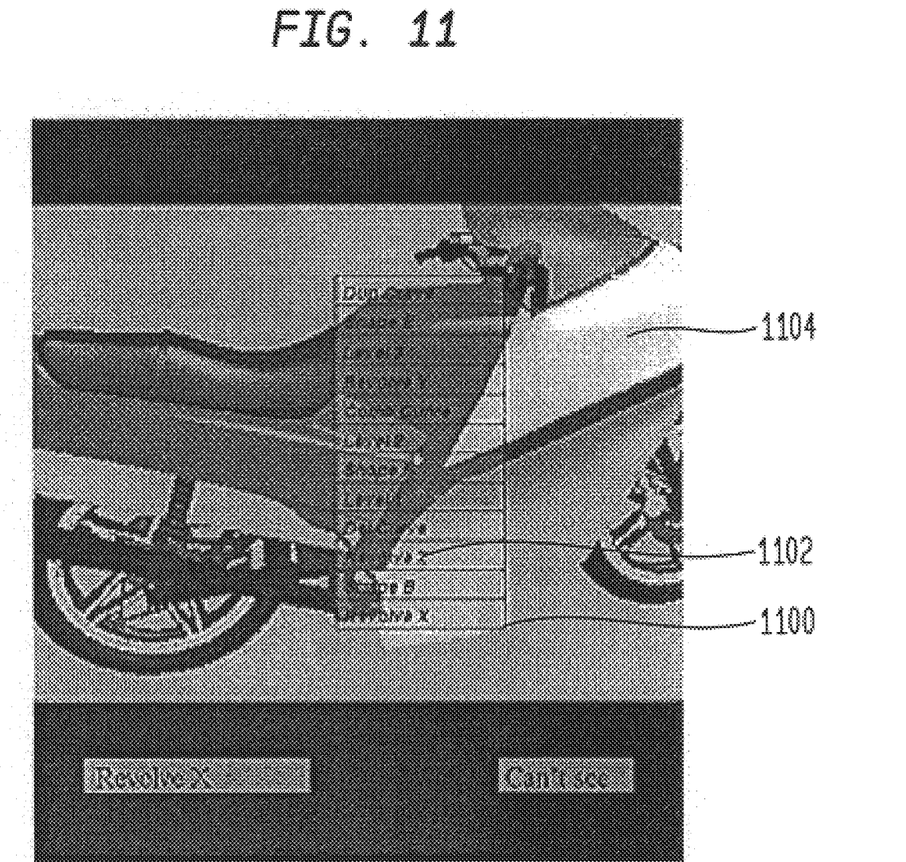
FIG. 11 illustrates a pop-up text menu using standard Motif style fonts and menu sizes, superimposed over a solid background image type.

For example, in one such evaluation, a standard sized pop-up text menu 1100 (as illustrated in FIG. 11) having menu item 1102 presented in standard Motif style fonts was superimposed over various background image types 1104 (e.g, solid images, wire frame models, and text pages). The level of transparency of menu 1100 was varied. Users were shown a target menu item and performed a standard menu selection task. That is, users were expected to use the mouse to move to an identified target item 1102 in menu 1100 and to select that item by clicking a mouse button (e.g., pointer device 114).

The control variables of this particular evaluation included: level of transparency, type of menu (without and with AI outlines in accordance with the present invention), and type of background. The dependent variables measured included: selection response time and error rate. A total of ten users performed 540 trials each. Detailed statistical analysis revealed that AI outlines had a highly significant positive benefit on response time (F test statistics results were F (1,9)=3.38, p<0.0001). A Student-Newman-Keuls post-hoc analysis was used to determine which levels were not statistically different (i.e., this test was used to determine the performance clustering). While AI outlines and the non-AI outlines showed little difference in response time performance between 0% (opaque menus) and approximately 50% (semi-transparent menus), there were substantial performance benefits at all levels of transparency greater than approximately 50% (ie., levels closer to clear where the combined image consists of more than approximately 50% background image and less than approximately 50% foreground menu image).

Figure 12:
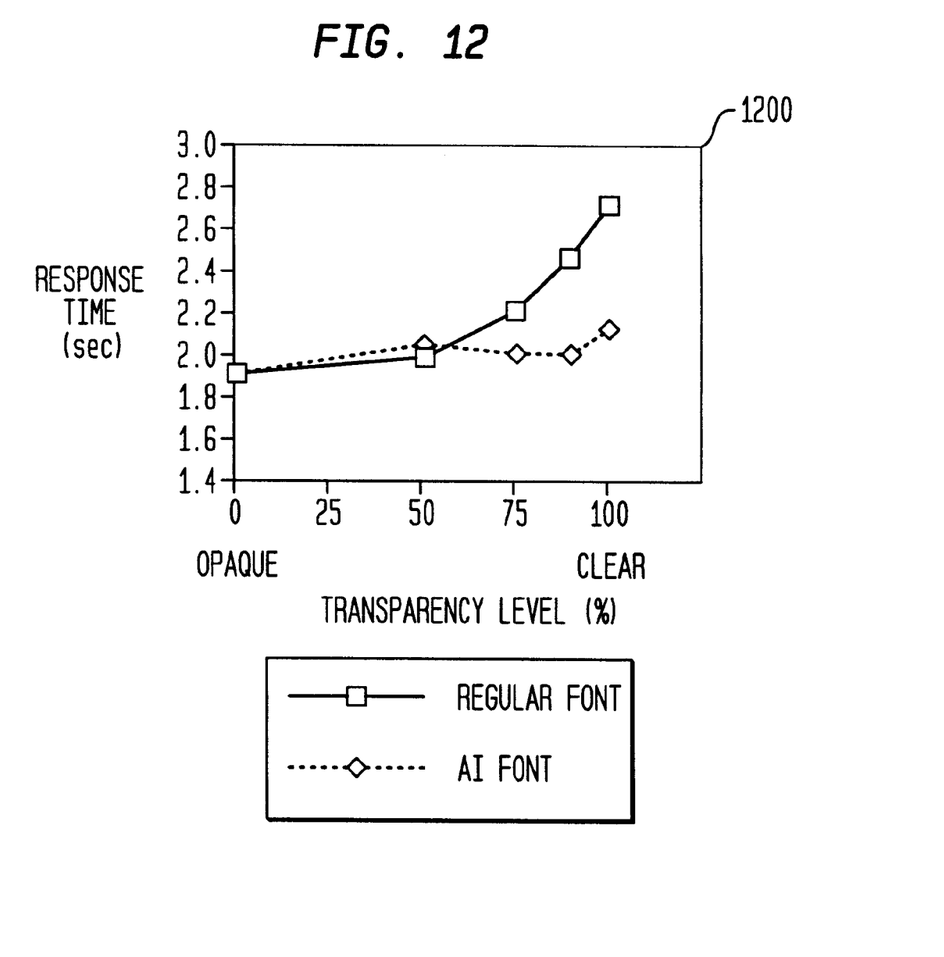
FIG. 12 illustrates a graph of user mean response times and transparency levels for font styles (regular and anti-interference outline fonts) in accordance with a preferred embodiments of the present invention.

FIG. 12 illustrates a graph 1200 of user mean response times by transparency levels for font styles (regular, non-AI outline and AI outline fonts) across various background types. As shown, AI outlines produced relatively stable and consistent performance without significant degradation regardless of how much the transparency level was increased. Analysis of the error data indicated that AI outlines produced no selection errors whereas the non-AI outline cases resulted in a number of errors at the 90% and 100% transparency level. Accordingly, direct user performance benefits are realized with the use of AI outlines in accordance with the present invention.

Other Embodiments

Another embodiment of the present invention is a computer program product (alternately referred to as a removable storage unit or a program storage device). As with the preferred embodiments above, this preferred embodiment also has a general hardware/software environment 100 as shown in FIG. 1. In this embodiment, computer program product or removable storage unit 136 includes a computer usable storage medium having stored therein computer programs/software and/or data. Such computer programs, when executed, enable computer platform 102 to perform the features of the present invention as discussed herein. In particular, the computer programs, when executed, enable CPU 108 to perform the features of the present invention. Accordingly, such computer programs represent controllers of computer platform 102. Alternatively, the computer programs (also called computer control logic) can also be stored in read only memory (ROM), random access memory (e.g., RAM 110), and/or other secondary storage medium, such as a CD.

In another preferred embodiment, the present invention is implemented primarily in hardware using, for example, a finite state machine. Implementation of such a finite state machine so as to perform the functions described herein will be apparent to persons skilled in the relevant art(s).

While the present invention has been particularly shown and described with reference to several preferred embodiments thereof, it will be apparent to a person skilled in the relevant art that various changes in form and details may be made therein without departing from the spirit and scope of the present invention as defined in the appended claims.

What is claimed is:

1. A system having a graphical user interface in which variably-transparent objects are displayed thereon, wherein the visual distinctiveness of the displayed objects is enhanced with anti-interference outlines, the system comprising:

computing means for computing an object property value for an object, wherein said object property value is computed using color model component values associated with said object; and determining means for determining an anti-interference outline property value for an anti-interference outline associated with said object, wherein said anti-interference outline property value is determined, using said object property value, to provide substantial visual distinctiveness between said object and said anti-interference outline.

2. The system according to claim 1, wherein said computing means and said determining means use a YIQ color model, and wherein said object property value and said anti-interference outline property value are luminance (Y) values of said object and said anti-interference outfine, respectively.

3. The system according to claim 1, wherein said anti-interference outline property value is [0,0,0] when $Y>Y_{max}/2$ and $[R_{max}, G_{max}, B_{max}]$ when $Y<Y_{max}/2$, wherein $Y_{max}$ is a maximum luminance value and $R_{max}$, $G_{max}$, and $B_{max}$ are maximum luminance values for red, green, and blue, respectively.

4. The system according to claim 1, wherein said computing means and said determining means use a CIE color model having component values of wavelength, saturation, and luminance to compute and determine said object property value and said anti-interference property value.

5. The system according to claim 1, wherein said computing means and said determining means use a HSB color model having component values of hue, saturation, and brightness to compute and determine said object property value and said anti-interference property value.

6. The system according to claim 1, further comprising generating means for generating variably-transparent objects, wherein said variably-transparent generating means uses alpha blending to generate said object.

7. The system according to claim 1, further comprising displaying means for displaying said object with said anti-interference outline on the graphical user interface.

8. The system according to claim 1, wherein anti-interference outlines are applied with all objects having transparency values greater than approximately 50 percent and wherein anti-interference outlines are not applied with all objects having transparency values less than approximately 50 percent.

9. The system according to claim 1, wherein anti-interference outlines are applied with all objects which overlap other objects of significantly high information density.

10. The system according to claim 1, further comprising reading means for reading an object data structure having said color model component values stored therein.

11. The system according to claim 10, wherein said object data structure also includes information regarding a width and a color of said anti-interference outline.

12. The system according to claim 10, wherein said object data structure has a plurality of color vectors for said object and said computing means determines a largest contributing color vector for said object and computes said object property value using said largest contributing color vector.

13. The system according to claim 1, wherein said object property value and said anti-interference outline property value are dynamically computed prior to display on the graphical user interface.

14. The system according to claim 1, further comprising an application program, wherein said computing means and said determining means are incorporated into said application program.

15. The system according to claim 1, further comprising an operating system and a plurality of application programs, wherein said computing means and said determining means are incorporated into said operating system, thereby providing anti-interference outlines to objects associated with said plurality of application programs.

16. The system according to claim 1, further comprising anti-aliasing means for anti-aliasing, wherein an anti-aliasing property value is computed using said anti-interference property value to further the visual distinctiveness of said object.

17. A computer program product for displaying variably-transparent objects on the monitor, the computer program product comprising:
a computer usable medium having a computer readable program code means embodied in said medium for enabling the computer system to provide an anti-interference outline for an object, said computer readable program code means comprising:
computer readable first program code means for enabling the computer system to compute an object property value for said object, wherein said object property value is computed using color model component values associated with said object; and
computer readable second program code means for enabling the computer system to determine an anti-interference outline property value for an anti-interference outline associated with said object, wherein said anti-interference outline property value is determined, using said object property value, to provide substantial visual distinctiveness between said object and said anti-interference outline.

18. The computer program product according to claim 17, wherein said computer readable first program code means and said computer readable second program code means use a YIQ color model, and wherein said object property value and said anti-interference outline property value are luminance (Y) values of said object and said anti-interference outline, respectively.

19. The computer program product according to claim 17, wherein said computer readable first program code means and said computer readable second program code means use a HSB color model having component values of hue, saturation, and brightness to compute and determine said object property value and said anti-interference property value.

20. The computer program product according to claim 17, further comprising computer readable third program code means to generate variably-transparent objects, wherein said variably-transparent generating means uses stippling to generate said object.

21. The computer program product according to claim 17, wherein said computer readable program code means is a graphical user interface program.

22. The computer program product according to claim 17, further comprising computer readable fourth program code means to provide anti-aliasing, wherein an anti-aliasing property value is computed using said anti-interference property value to further the visual distinctiveness of said object.

23. A method of providing variably-transparent objects with anti-interference outlines for display on a monitor, the method comprising steps of:
computing an object property value for an object, wherein said object property value is computed using color model component values associated with said object; and
determining an anti-interference outline property value for an anti-interference outline associated with said object, wherein said anti-interference outline property value is determined, using said object property value, to provide substantial visual distinctiveness between said object and said anti-interference outline.

* * * * *